UNITED STATES PATENT OFFICE.

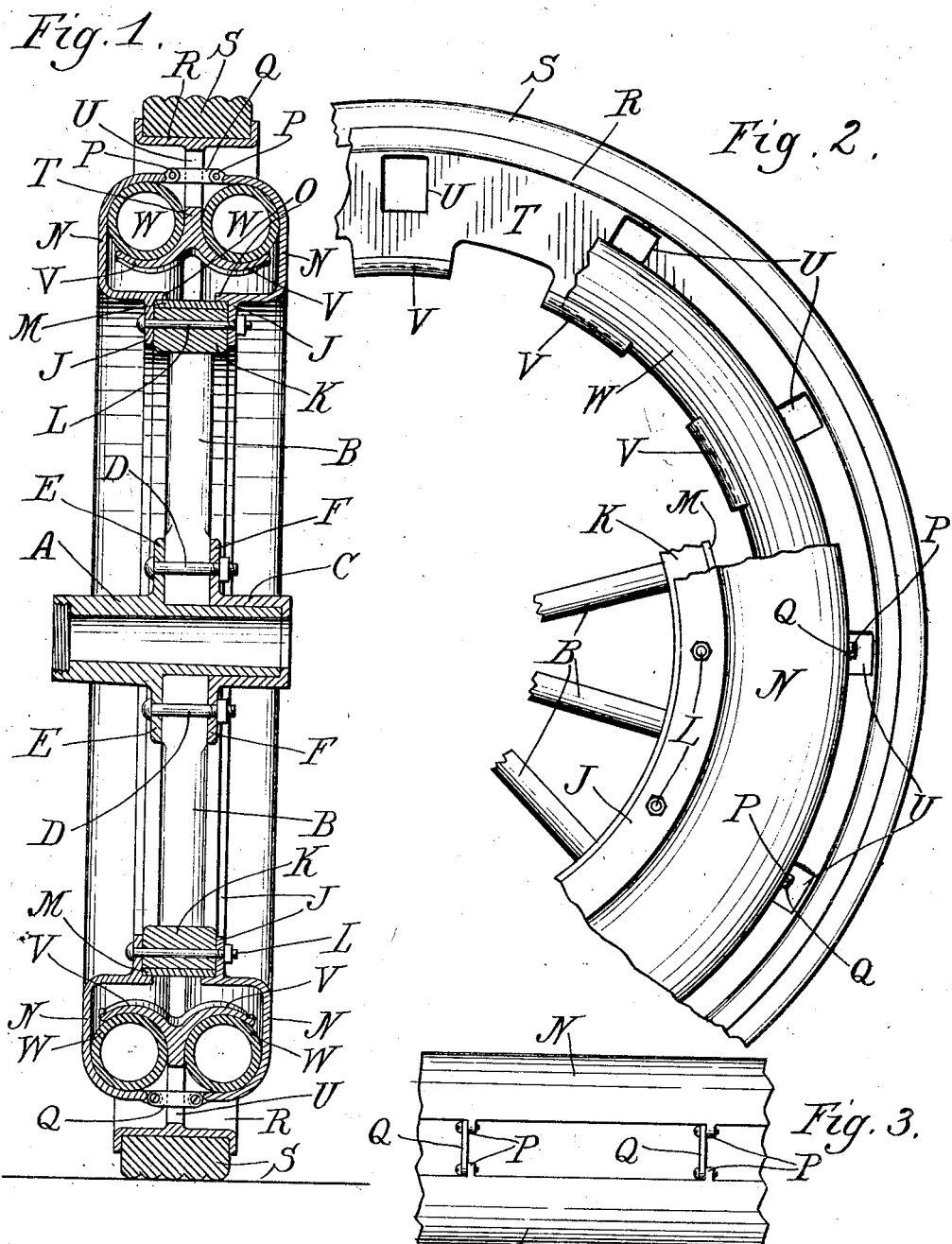

JOHN C. MacLACHLAN, OF CHICAGO, ILLINOIS, ASSIGNOR OF ONE-FOURTH TO ALBERT P. HUNT, ONE-FOURTH TO GEORGE H. GROUNDS, AND ONE-FOURTH TO DANIEL F. ORANGE, ALL OF CHICAGO, ILLINOIS.

ELASTIC WHEEL.

955,417.  Specification of Letters Patent.  Patented Apr. 19, 1910.

Application filed August 10, 1908. Serial No. 447,685.

*To all whom it may concern:*

Be it known that I, JOHN C. MacLACHLAN, a citizen of the United States, residing at Chicago, in the county of Cook and State of Illinois, have invented a certain new and useful Improvement in Elastic Wheels, of which the following is a specification.

My invention relates to elastic wheels, and is illustrated in the accompanying drawings, wherein—

Figure 1 is a vertical section through such wheel; Fig. 2 a side elevation of a portion of the same with parts broken away, and Fig. 3 a detail elevation.

Like parts are indicated by the same letter in all the figures.

A is the hub of a wheel having the spokes B B thereon.

C is a thimble on one end of the hub, and the spokes are held in position by the cross bolts D D which pass through a flange E on the hub, a flange F on the thimble and the spokes themselves.

J J are annuli secured on the felly K by the cross bolts L L therethrough, and M is a metallic band encircling the felly. Each of the annuli has at its outer end an extension N, shaped as shown with a collar O overlying the metal piece M, and a series of lugs P whereby it is secured to the opposite extension N by means of a series of links Q Q. When these parts are assembled as indicated they form a sort of hollow annular chamber about the outer portion of the wheel.

R is a rim U-shaped in cross section, and containing the tread S and the inwardly projecting flange T which is slotted at U U to let the links Q Q pass, and is provided at its inner end with outwardly projecting plates V V which form seats for the elastic tires W W.

I have endeavored to illustrate an operative and complete form of construction, and yet I wish my drawings to be taken as diagrammatic, because it is obvious that many changes may be made without departing from the spirit of my invention, and that the details may be generally altered, some omitted and others substituted.

The use and operation of my invention are as follows:—The parts can obviously be easily assembled but when they are put together the wheel presents an exterior preferably rubber tread with inner protected pneumatic tubes. When the wheel sets in the position indicated by Fig. 1, the weight of the load is thrown onto the upper portion of the tubes, so that the front of the wheel when it descends, compresses these tubes between the extension N and the plates V at the tubes. The tubes are protected and inclosed.

I claim:

In a wheel the combination of a hub with spokes, a felly, an outer hollow annular case, an outer tread having an inwardly projecting annular flange and supporting plates connected thereto within the case, and pneumatic tubes within the case and between the plates and the case wall, said case consisting of two convex rings placed opposite each other and provided with links, and said annular flange perforated to permit the links to pass therethrough.

JOHN C. MacLACHLAN.

Witnesses:
SOPHIE B. WERNER,
LUCY A. FALKENBERG.